United States Patent
Teener et al.

(10) Patent No.: US 6,529,984 B1
(45) Date of Patent: Mar. 4, 2003

(54) DUAL PHASE ARBITRATION ON A BUS

(75) Inventors: Michael D. Johas Teener, Santa Cruz, CA (US); David R. Wooten, Spring, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/537,347

(22) Filed: Mar. 29, 2000

(51) Int. Cl.⁷ ............................................... G06F 13/14
(52) U.S. Cl. ...................... 710/240; 370/462; 370/419; 710/241; 710/242; 710/243; 710/244; 710/200; 710/220
(58) Field of Search ........................... 710/240; 370/462

(56) References Cited

U.S. PATENT DOCUMENTS

| | | | | |
|---|---|---|---|---|
| 5,394,556 A | * | 2/1995 | Oprescu | 340/825.02 |
| 5,400,340 A | * | 3/1995 | Hillman et al. | 370/419 |
| 5,463,624 A | * | 10/1995 | Hogg et al. | 340/825.5 |
| 5,490,253 A | * | 2/1996 | Laha et al. | 710/1 |
| 5,507,001 A | * | 4/1996 | Nishizawa | 710/22 |
| 5,579,486 A | * | 11/1996 | Oprescu et al. | 370/462 |
| 5,613,076 A | * | 3/1997 | Latif et al. | 710/113 |

OTHER PUBLICATIONS

M. Morris Mano, Computer System Architecture, 1982, Prentice–Hall Inc., 2nd edition, pp. 47–48.*

* cited by examiner

Primary Examiner—Peter Wong
Assistant Examiner—Justin King
(74) Attorney, Agent, or Firm—Conley Rose, P.C.; Michael F. Heim; Jonathan M. Harris

(57) ABSTRACT

A multiphase IEEE 1394 network of nodes requires all nodes to broadcast their current understanding of the phase of the bus (e.g., odd or even). Even if a node is not requesting ownership of the bus, it must send a message that indicates which phase that node believes to be the current phase of the network. If a node that does not need ownership of the bus believes the bus currently is in the odd phase, then that node will transmit a "None_odd" message indicating the node's understanding that the bus is in the odd phase. Similarly, if a node that does not need the bus believes the bus currently is in the even phase, then that node will transmit a "None_even" message indicating the node's understanding that the bus is in the even phase. Preferably, the current bus owner will not switch the phase of the bus until all nodes have a correct understanding of the current phase of the bus.

4 Claims, 3 Drawing Sheets

DUAL PHASE ARBITRATION ON A BUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to arbitration on a digital bus. More particularly, the invention relates to an improved arbitration on an IEEE 1394 bus. More particularly still, the invention relates to an improved dual phase arbitration scheme on an IEEE 1394 bus.

2. Background of the Invention

A "bus" is a collection of signals interconnecting two or more electrical devices that permits one device to transmit information to one or more other devices. There are many different types of busses used in computers and computer-related products. Examples include the Peripheral Component Interconnect ("PCI") bus, the Industry Standard Architecture ("ISA") bus and Universal Serial Bus ("USB"), to name a few. The operation of a bus usually defined by a standard which specifies various concerns such as the electrical characteristics of the bus, how data is to be transmitted over the bus, how requests for data are acknowledged, and the like. Using a bus to perform an activity, such as transmitting data, requesting data, etc., is generally called running a "cycle." Standardizing a bus protocol helps to ensure effective communication between devices connected to the bus, even if such devices are made by different manufacturers. Any company wishing to make and sell a device to be used on a particular bus, provides that device with an interface unique to the bus to which the device will connect. Designing a device to particular bus standard ensures that device will be able to communicate properly with all other devices connected to the same bus, even if such other devices are made by different manufacturers. Thus, for example, an internal fax/modem (ie., internal to a personal computer) designed for operation on a PCI bus will be able to transmit and receive data to and from other devices on the PCI bus, even if each device on the PCI bus is made by a different manufacturer.

According to most bus protocols, a device that needs to run a cycle on the bus must first gain control of the bus. Once the sending device has control of the bus, that device then can run its desired cycle, which may entail transmitting data to a receiving bus device. Often, more than one bus device may concurrently need to initiate a cycle on the bus. Bus protocols in which multiple devices may request control of the bus to run cycles usually implement some form of "arbitration" to efficiently decide which device to grant control of the bus among multiple devices requesting control. The prior art is replete with many types of arbitration schemes.

Currently, there is a market push to incorporate various types of consumer electronic equipment with a bus interface that permits such equipment to be connected to other equipment with a corresponding bus interface. For example, digital cameras, digital video recorders, digital video disks ("DVDs"), printers are becoming available with an IEEE 1394 bus interface. The IEEE ("Institute of Electrical and Electronics Engineers") 1394 bus, for example, permits a digital camera to be connected to a printer or computer so that an image acquired by the camera can be printed on the printer or stored electronically in the computer. Further, digital televisions can be coupled to a computer or computer network via an IEEE 1394 bus.

The present invention provides an improvement to arbitration on the IEEE 1394 bus, although the principles of the present invention may extend to other bus protocols, certainly other bus protocols experiencing a similar arbitration problem to that described below. To understand the nature of the problem solved by the present invention, the general structure and operation of an IEEE 1394 bus and arbitration scheme will now be provided. Referring to FIG. 1, an IEEE 1394 network 50 comprises one or more "nodes," node 1–node 7. A node represents an electronic device(s) with an IEEE 1394 bus interface. A node device may comprise a computer, a digital camera, a digital video recorder, a DVD player, or another type of device having a suitable bus interface. Each node couples to at least one other node. As shown in the exemplary architecture of FIG. 1, node 1 couples both to nodes 2 and 3. Node 3, in turn, couples to nodes 4, and 5 and node 5 also couples to nodes 6 and 7. In general, each node can transmit data to any other node in the network. For example, node 7 can transmit data to node 2, but the transmitted data will pass from node 7 to node 5 to node 3 to node 1 and then, to node 2.

The IEEE 1394 standard has undergone modification from the initial release of the bus standard referred to as "IEEE 1395-1995" to the current approved standard called "IEEE 1394a." The changes from IEEE 1395-1995 to IEEE 1394a are beyond the scope of relevance of the present invention and thus are not discussed in this disclosure. Currently, modification of the IEEE 1394a standard to a new version known as IEEE 1494b is underway. The proposed IEEE 1394b protocol includes a rework of the way in which arbitration works on the bus. The proposed IEEE 1394b arbitration will now be described with continued reference to FIG. 1.

In accordance with the IEEE 1394b standard, one of the nodes is selected to be the Bus Owner/Supervisor/Selector ("BOSS"). For a node to be a BOSS node means that node has control over the bus. For a node to transmit its data to another node or send a data request to another node, the sending node must become the BOSS. Thus, any node in the network can potentially become the BOSS and, in fact, must become the BOSS to transmit data or send a request for data to another node. Under normal operation, there is always a node that is the BOSS at any given time. One of the tasks that a BOSS node performs is to select another node to act as the next BOSS. Thus, in contrast to various other types of busses that have fixed logic that makes the arbitration decisions, each current BOSS node makes the arbitration decision, then grants ownership of the bus to the new BOSS node.

The IEEE 1394b proposal uses a "dual phase" pipelined arbitration scheme. In this arbitration scheme, there are two phases: an "odd" phase and an "even" phase. The bus is in either the odd phase or the even phase at any one point in time. Arbitration decisions are made based on the current state of the bus and the types of arbitration requests being received by the BOSS node. Each node is aware of the current phase of the bus and issues requests to be the BOSS based on the current phase. Once all of the current requests related to the current phase have been granted and completed, the bus phase switched to the opposite phase.

Switching the phase of the bus is accomplished by the BOSS issuing an arbitration reset message.

The types of requests that the nodes can issue, in order of arbitration priority from highest priority to lowest priority, include:

1. Cycle_start_req_a request to be BOSS so that the period and cycle start packet can be sent
2. Border_High_a request to be BOSS so that the gap timing of an attached 1394a bus can be preserved
3. Next_odd_a request to be a BOSS when the bus, currently in the even phase, switches to the odd phase; if the bus is currently in the odd phase, then the priority level of Next_odd becomes 5 and the level of Next_even becomes 3
4. Current_request to be a BOSS in the current phase of the bus
5. Next_even_a request to be a BOSS when the bus, currently in the odd phase, switches to the even phase
6. Border_Low_used to keep the beta side of a border node from advancing to a new fairness cycle Thus, for example, a request from a node that issues a Cycle start req is given higher priority than a node that issues a Next_odd request.

With the arbitration scheme proposed above for the IEEE 1394b bus protocol, a "race" condition can occur that can degrade the performance of the bus. The following example, which focuses on nodes 1, 2, and 7, will illustrate this problem. Assuming node 1 is the current BOSS, nodes 2 and 7, as well as any other node, may request control of the bus. As is obvious from FIG. 1, node 2 is close to node 1 (the BOSS) in the sense that there are no intervening nodes between nodes 1 and 2. Node 7, on the other hand, is farther from node 1 as there are two nodes, nodes 3 and 5, through which communications must flow between nodes 1 and 7. Assume further that the bus is currently in the odd phase and that node 2 and node 7 request control of the bus when it switches to the even phase (by issuing Next_even requests).

Because the Next_even request from node 2 will reach the BOSS node (node 1) before the Next_even request, node 1 may switch the bus to the even phase by issuing an Arbitration reset message to all nodes. At this point, the Next_even request from node 7 may still be working its way up the network to node 1, but it may not yet have reached node 1. With the bus reset to the even phase, node 1 may grant bus control to node 2 to be the next BOSS to permit node 2 to perform its desired cycle. Node 2, the new BOSS, will run its cycle and then arbitrate to determine which node will be the next BOSS. Node 2's arbitration decision may be made while the original Next_even request from node 7 is still percolating up through nodes 5 and 3 of the network. In fact, node 2 may reset bus back to the odd phase and grant bus control back to node 1 while node 7's Next_even request still has not been received by nodes 1 or 2. At this point, the bus has transitioned from the odd phase to the even phase and back to the odd phase, and node 7's request for bus control of the bus in the even phase is out of synch with the operation of the bus.

One suggestion to solve this problem involves the use of a timer that prevents the BOSS from sending an arbitration reset message to switch the phase of the bus before the timer expires. The timer is set to expire in an amount of time at least equal to the maximum time it would take for an arbitration request message to be transmitted between the two most distant nodes in the network (e.g., nodes 2 and 7 in FIG. 1) and an acknowledgment to be returned. This timer-based solution is less than optimal because the maximum round trip time varies with the size of each network and either must be preset for all networks or must be customized for each network. Indeed, the problem is worse, since the optimal time is different for each node. Further, the bus is not able to reset itself to the opposite phase until a time period passes that may be longer than necessary for a given bus status, thereby diminishing the performance of the bus.

Thus, an improvement needs to be made to this arbitration scheme to avoid the race condition exemplified above. No such solution is known to exist today.

BRIEF SUMMARY OF THE INVENTION

The problems noted above are solved in large part by a multiphase network of nodes that requires all nodes to broadcast their current understanding of the phase of the bus (e.g., odd or even). Even if a node is not requesting the bus, it must send a message that indicates which phase that node believes to be the current phase of the network. If a node that does not need the bus believes the bus currently is in the odd phase, then that node will transmit a "None_odd" message indicating the node's understanding that the bus is in the odd phase. Similarly, if a node that does not need the bus believes the bus currently is in the even phase, then that node will transmit a "None_even" message indicating the node's understanding that the bus is in the even phase. Preferably, the current BOSS will not switch the phase of the bus, by issuing an arbitration reset message, until all nodes have a correct understanding of the current phase of the bus. This solution to the race condition problem identified above advantageously precludes the race condition from occurring while avoiding the use of timers and the problems associated with such timers noted above.

The arbitration priorities of the various messages on the bus preferably are set so that a "None" message of the opposite phase has a higher priority than a "Next" request message of the opposite phase. Setting the arbitration priority levels in this way prevents the BOSS from considering all "Next" requests of the opposite phase until the BOSS insures that all nodes are aware of the current correct bus phase.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to...". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

The preferred embodiment of the invention, described below, solves the problems noted above generally by requiring that all nodes on the bus broadcast their understanding of the phase of the current bus (odd or even). Even if a node is not requesting the bus to run a cycle, it should send a message to its neighboring mode that indicates which phase that node believes to be the current phase of the bus. Thus, if a node that does not need the bus believes the bus currently is in the odd phase, then that node will transmit a "None_odd" message indicating the node's understanding that the bus is in the odd phase. Similarly, if a node that does not need the bus believes the bus currently is in the even phase, then that node will transmit a "None_even" message indicating the node's understanding that the bus is in the even phase. These idle messages eventually will be received by the BOSS which preferably will not switch the phase of the bus, by issuing an arbitration reset message, until all nodes have a correct understanding of the current phase of the bus. As such, the race condition identified above advantageously is avoided. This solution to the race condition problem advantageously precludes the race condition from occurring while avoiding the use of timers and the problems associated with such timers noted above.

The arbitration priorities of the various messages on the bus preferably are set so that a "None_even/odd" idle message of the opposite phase from the current phase has a higher priority than a "NEXT" request message of the opposite phase. This arbitration scheme will be explained below. Setting the arbitration priority levels in this way prevents the BOSS from considering all "NEXT" requests of the opposite phase until the BOSS insures that all nodes are aware of the current correct bus phase.

Figure 1:
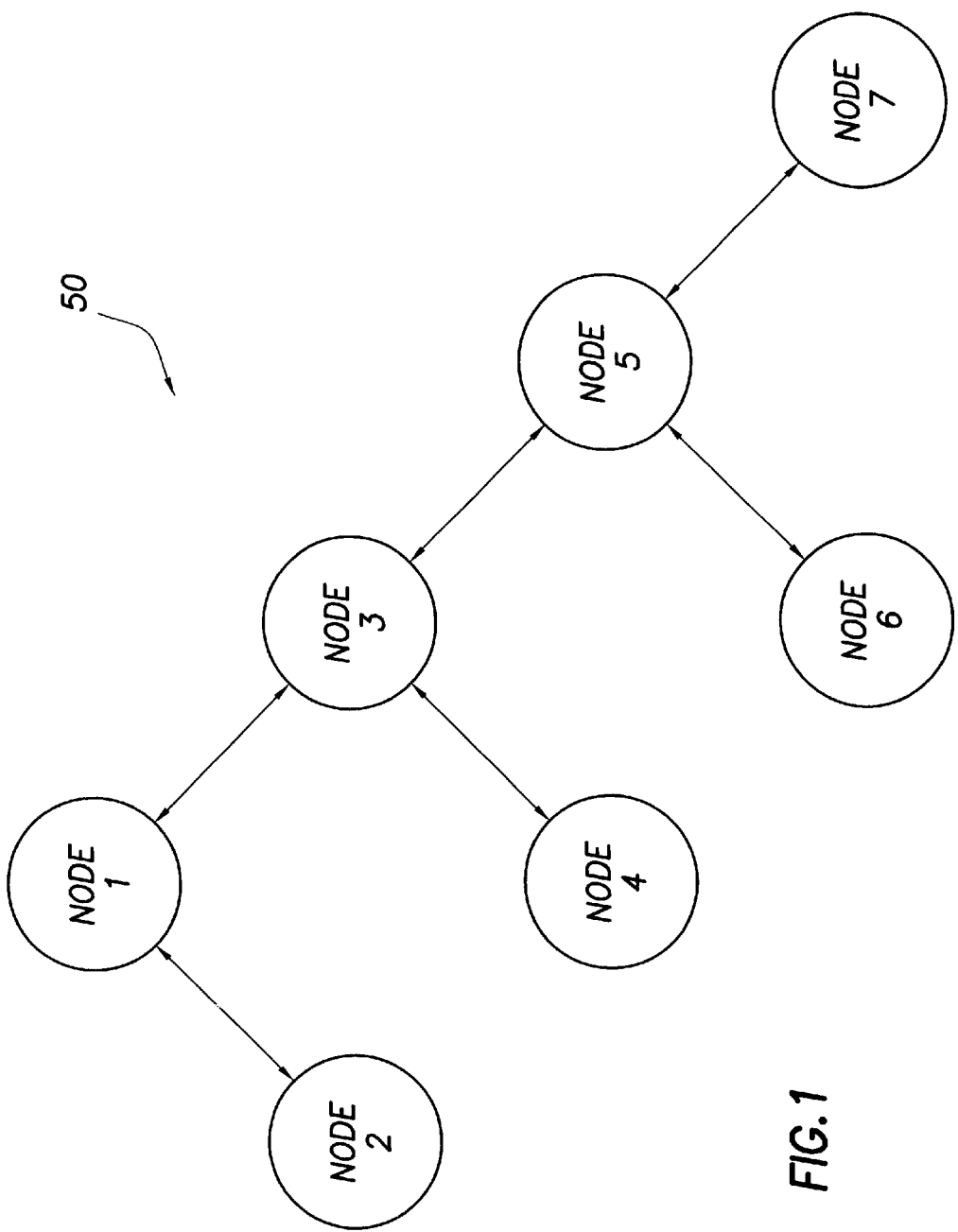
FIG. 1 shows a schematic representation of an IEEE 1394b network.
Figure 2:
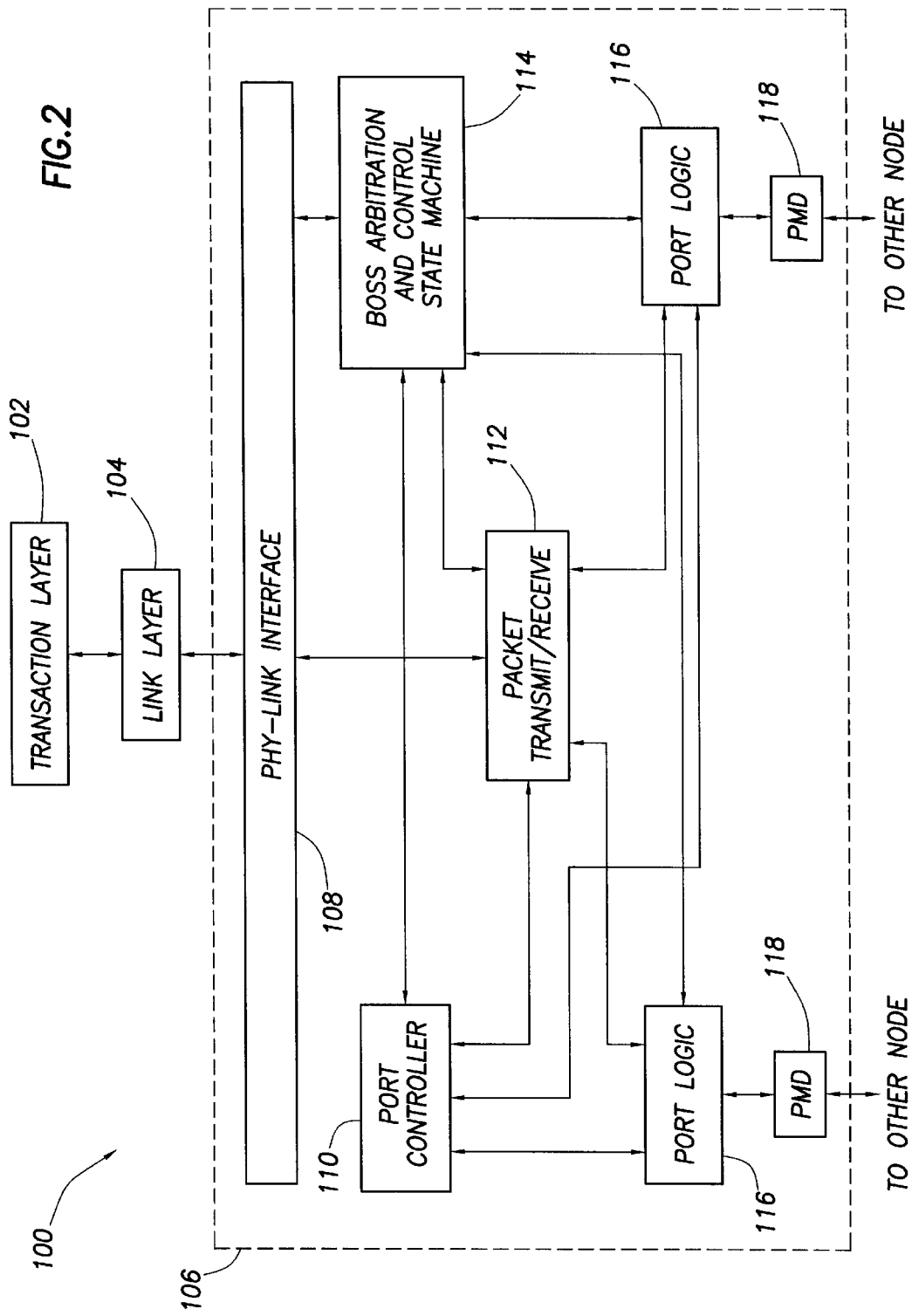
FIG. 2 is a block diagram of a single node in the network of FIG. 1.
Figure 3:
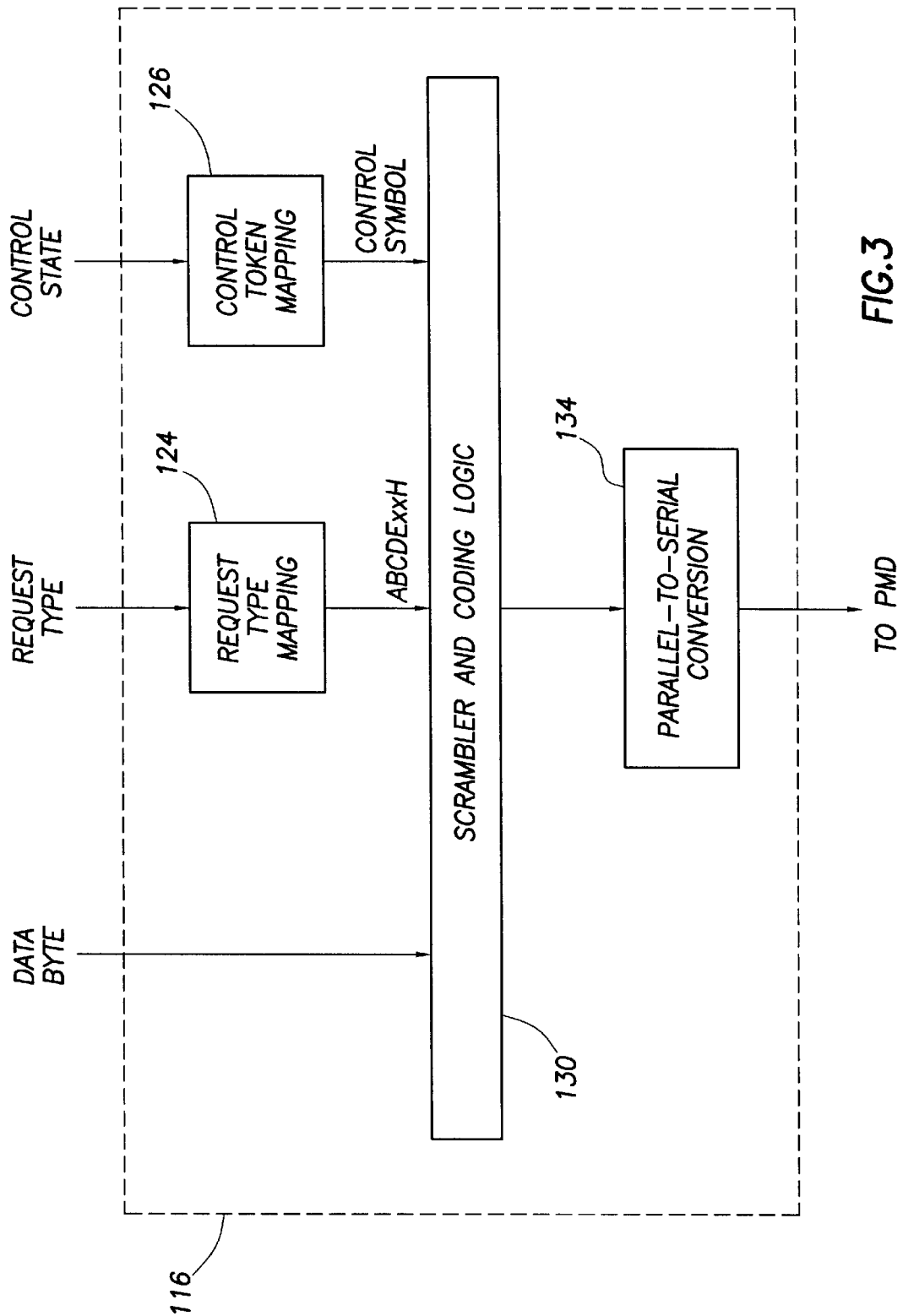
FIG. 3 is a block diagram of port logic in the node of FIG. 2.

The preferred structure to implement this arbitration scheme is shown in FIGS. 2 and 3 which depicts the structure of a single node in FIG. 1. The preferred embodiment is illustrated with respect to an IEEE 1394 implementation, although it could be applied to other bus protocols now known or later created. Referring first to FIG. 2, a node 100 generally comprises three "layers": a transaction layer 102, a link layer 104 and a physical layer 106 (referred to as a "PHY"). The transaction layer logic 102 implements the request-response protocol required to conform to the IEEE 1394 standard in accordance with known techniques. The link layer logic 104 supplies an acknowledgment "datagram" to the transaction layer. A datagram is a one-way data transfer with request confirmation. The link layer 104 handles all packet transmission and reception responsibilities as well as the provision of cycle control for isochronous channels. The PHY 106 generally provides the initialization and arbitration services necessary to assure that only one node at a time is sending data and to translate the serial bus data stream and signal levels to those required by the link layer logic 104. The PHY 106 also implements the arbitration scheme of the preferred embodiment of the invention.

Referring still to FIG. 2, the PHY 106 preferably includes a PHY-Link interface 108, a port controller 110, a packet transmit/receive 112, a BOSS arbitration and control state machine 114, one or more port logic units 116, and a physical media dependent ("PMD") electronics unit 118 for each port 116. Each port 116 can be used to couple the nodes to another node in the network. Any number of ports between 1 and 16 (according to the current IEEE 1394 standard) can be included within each node. Although two ports 116 are shown in the preferred embodiment of FIG. 2, the number of ports is not important for the present invention. Each port 116 couples to a PMD 118 which provides the necessary electrical interface to the particular physical communications medium. The physical communications medium may include any suitable type of medium such as Cat. 5 UTP, glass optical fiber, plastic optical fiber, beta-only electrical, bilingual electrical or DS-only electrical types of communication media. Each port 116 and its associated PMD 118 can be connected via a communication medium to another node in the network.

The port controller 110 generally controls the interface to another node in the network. The packet transmit/receive 112 generally receives and forwards all data packets. The packet transmit/receive 112 includes logic (not shown) to effectively control the flow of data cycles through the PHY 106.

Any node in the network can request ownership of the network to be the BOSS by transmitting an appropriate request to all of the neighboring nodes to which the requesting node connects. As such, each node in the network can receive requests from its neighboring nodes to be the BOSS and each node itself can request ownership of the bus. The BOSS arbitration and control state machine 114 within a node receives all of the requests from its neighboring nodes in the network, via the various port logic units 116 and PMDs 118, as well as its own request to be BOSS. The BOSS arbitration and control state machine 114 then prioritizes these various requests and sends out the highest priority request to all neighboring nodes through all active ports 116 not currently being used to transmit data. Eventually, the requests propagate their way to the current BOSS who grants ownership of the bus to the highest priority requests. The types of requests and their relative priorities are included below in Tables 1 and 2 below.

Generally, IEEE 1394 supports two types of data transfers: asynchronous and isochronous. Asynchronous data transfers are sent to a specific address and an acknowledgment is returned to verify receipt of the data. Isochronous transfers guarantee data transfers at a predetermined rate which is particularly beneficial for time-critical, multimedia data transfers. Arbitration decisions are made separately for the asynchronous requests and isochronous requests. Accordingly, the BOSS arbitration and control state machine 114 prioritizes the asynchronous requests separately from the isochronous requests and provides the highest priority request from each type (asynchronous and isochronous) to the ports not currently transmitting data for transmission to other nodes. The preferred embodiment of the present invention focuses on asynchronous requests although the concepts could easily be extended to isochronous requests as well.

Referring now to FIG. 3, each port logic 116 preferably includes request type mapping logic 124, control token mapping logic 126, scrambler and coding logic 130, and parallel-to-serial conversion logic 134. The functions performed by these components will be explained below. Each node in the network is, at least partially, involved in the arbitration process. The BOSS arbitration and control state machine 114 of each node evaluates the pending requests received from its neighboring nodes and determines the highest priority requests. The highest priority requests are then forwarded on to other nodes then determine the highest priority among the requests they receive. The asynchronous and isochronous requests and their preferred relative priorities are shown in Tables 1 and 2 below.

TABLE 1

Asynchronous Requests and Arbitration Priorities

| Request Name | Priority Level | Description |
|---|---|---|
| Cycle_start_req | 1 (highest) | |
| Border_high | 2 | Keeps the 1394a/b protocol working correctly, performed at high priority to handle legacy PHYs. |
| Next_odd | 3 if last arbitration reset was odd, otherwise 6 | |
| Current | 4 | Used for all normal asynchronous requests by nodes that haven't used up fairness budget. |
| No_req_even | 5 if last arbitration reset was odd, 7 otherwise | |
| Next_even | 6 if last arbitration reset was odd, 3 otherwise | |
| No_req_odd | 7 (lowest) if last arbitration reset was odd, 5 otherwise | |

TABLE 2

Isochronous Requests and Arbitration Priorities

| Request Name | Priority Level | Description |
|---|---|---|
| Isoch_odd | 1 (highest) if last cycle_start was odd, 2 otherwise | Used if last cycle_start was odd and packet is to be sent in current cycle. Used if last cycle_start was even and packet to be sent in next cycle. |
| Isoch_even | 2 if last cycle_start odd, 1 otherwise | Used if last cycle_start was even and packet to be sent in current cycle. Used if last cycle_start was odd and packet to be sent in next cycle. |
| No_isoch_req | 3 (lowest) | |

Once the BOSS arbitration and control state machine 114 determines the highest priority pending request types, it provides those request types to the request type mapping logic 124, which then converts those request types to an arbitration "token." The arbitration token preferably comprises an 8-bit value that represents the highest priority asynchronous and isochronous requests as determined by the BOSS arbitration and control state machine 114. The token, shown as "ABCDExxH" in FIG. 3, then is provided to the scrambler and coding logic 130. The output from scrambler and coding logic 130 then is provided to the parallel-to-serial conversion logic 134 which converts the parallel input to a serial format in accordance with known techniques. The resulting serial bit stream is then provided to the port's associated PMD 118 and transmitted to another node. The control token mapping 126 converts various items, such as packet delimiters and speed indicators, to 4-bit control symbols.

The various asynchronous and isochronous request types along with the associated symbol bits comprising the arbitration token are shown below in Tables 3 and 4.

TABLE 3

Asynchronous Request Type Mapping

| Request type | Symbol component bits ABC |
|---|---|
| Reserved | 000 |
| Current | 001 |
| Next_even | 010 |
| Cycle_start_req | 011 |
| None_odd | 100 |
| Next_odd | 101 |
| None_even | 110 |
| Reserved | 111 |

TABLE 4

Isochronous Request Type Mapping

| Request type | Symbol component bits DEFGH |
|---|---|
| Not used | 00x00 |
| Isoch_none | 01xx0 |
| Isoch_even | 10xx0 |
| Isoch_odd | 11xx0 |
| Reserved | 00xx1 |
| Reserved | 01xx1 |
| Reserved | 10xx1 |
| Not used | 11xx1 |

The symbol bits F and G in Table 4 (marked as having value "x") are not used to convey request type information. However, they have been included in the bit definitions of the request type mapping because the 8-bit symbol is used as an input to the scrambler and coding logic 130. The request type mapping logic 124 receives selects a 3-bit value shown in Table 3 and a 5-bit value shown in Table 4 corresponding to the request types provided to it from the BOSS arbitration and control state machine 114. The request type mapping logic 124 concatentates the two values together to produce the ABCDExxH value shown in FIG. 3. This value is the arbitration token and is provided to all neighboring nodes to indicate the highest priority requests from the sending node.

In accordance with the preferred embodiment of the invention, the request types in Tables 1 and 3 for the asynchronous requests includes the idle messages: "None_odd" and "None_even." The None_odd request indicates that the node does not need to run a cycle but understands the bus currently to be in the odd phase. Similarly, the None_even request indicates that the node does not need to run a cycle but understands the bus currently to be in the even phase. Thus, both requests are idle requests that include an indication of which phase the node determines to be the current phase. Of course, the node's determination of the current phase may be incorrect, and the BOSS node (which knows the correct phase) will not switch the phase of the bus until all nodes report the correct phase.

The arbitration tokens from the various nodes propagate their way through the network in accordance with known IEEE 1394 techniques. Eventually, the node that is the BOSS receives the arbitration tokens from its neighboring nodes. In accordance with the preferred embodiment of the present invention as explained above, the BOSS will not switch phases until all nodes have a correct understanding of the current phase of the bus. Accordingly, the BOSS will not switch phases until the only requests it receives are requests for the opposite phase and/or "None" requests for the current phase. A "None" request for the opposite phase indicates that node believes the bus to be in the opposite phase from the current phase and thus has not yet synchronized itself to the current bus phase. Eventually, that particular node will "catch up" and issue a "None" request for the correct current phase.

In this manner, the preferred embodiment of the invention solves the race condition that was problematic of the IEEE 1394 bus. The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of arbitrating on a bus coupling together a plurality of nodes and having two arbitration phases comprising:

(a) selecting a current bus owner, the current arbitration phase being either of the two phases;

(b) the current bus owner resulting from (a) receiving any one or more of the following: a request from a node to be the bus owner when the bus changes to the opposite phase from the current phase, a request from a node to be the bus owner for the bus in its current phase, and an idle message from a node not requesting to be the bus owner and including an indication of which phase the node has determined to be the current phase;

(c) changing the phase of the bus when all of the requests and idle messages received in (b) by the current bus owner include only requests from a node to be the bus owner when the bus changes to the opposite phase from the current phase and idle messages including an indication that the nodes sending the idle messages have all correctly determined the arbitration phase of the bus.

2. The method of claim 1 wherein the phases include an odd phase and an even phase.

3. The method of claim 1 further including sending the idle message from a sending node to a receiving node, the idle message indicating that the sending node does not need to be the bus owner and including an indication of which phase the sending node believes to be the current phase.

4. The method of claim 3 the bus comprises an IEEE 1394 bus.

* * * * *